United States Patent [19]

Margolis

[11] Patent Number: 4,988,173
[45] Date of Patent: Jan. 29, 1991

[54] MODULAR AFOCAL VARIATOR OPTICAL FOCUSING SYSTEM

[76] Inventor: H. Jay Margolis, 704 Mohawk Dr., #15, Boulder, Colo. 80303

[21] Appl. No.: 286,307

[22] Filed: Dec. 19, 1988

Related U.S. Application Data

[63] Continuation-in-part of Ser. No. 169,271, Mar. 17, 1988, abandoned.

[51] Int. Cl.$^5$ .................. G02B 15/02; G02B 15/15
[52] U.S. Cl. .................................. 350/423; 350/422
[58] Field of Search ...................... 350/423, 422, 464

[56] References Cited

U.S. PATENT DOCUMENTS 4,426,135  1/1984  Hashiya ............................ 350/422

Primary Examiner—Bruce Y. Arnold
Assistant Examiner—Rebecca D. Gass
Attorney, Agent, or Firm—Donald W. Margolis

[57] ABSTRACT

A modular optical system is provided in which a central element which carries an afocal variator optical system is provided, and to which central element both a front optical system and a rear optical system can be substantially permanently connected in optical series in combination. The modular optical system has the ability to vary the actual focal length of the front optical system in conjunction with the rear optical system without the need to physically change the length dimension or the lens position or the lenses of the front optical system. The afocal variator optical system includes in optical series a first positive lens, a negative lens, and a second positive lens. Within the afocal variator optical system the negative lens is so positioned and so controlled that it is capable of being moved continuously either towards and away from the first positive lens and towards and away from the second positive lens, all while the distance between the first positive lens and the second positive lens of the afocal variator optical system remains substantially constant. The afocal variator optical system is located and supported by a system which includes front and rear end connecting means for substantially permanently connecting it with the front optical system and rear optical system, respectively. Means are also provided in conjunction with the front optical system and the rear optical system to allow their susbstantially permanent connection to the afocal variator support system.

18 Claims, 1 Drawing Sheet

MODULAR AFOCAL VARIATOR OPTICAL FOCUSING SYSTEM

This is a continuation-in-part of application Ser. No. 169,271 filed Mar. 17, 1988, now abandoned.

BACKGROUND OF THE INVENTION (a) Field of the Invention

This invention relates to a modular optical imaging system. More specifically it relates to such a system in which a central element which carries an afocal variator optical system is provided, and to which central element both a front optical system and a rear optical system can be substantially permanently connected in combination to vary the actual focal length of the front optical system in conjunction with the rear optical system without the need to physically change the length dimension of any system, or without the need to change the lens position, or without the need to change lenses of the front or rear optical systems.

(b) Discussion of the Prior Art

"Varios" and "variators" are well known and useful optical systems. Such systems have found use primarily in zoom lens systems and in projectors, for example, to change the size of a projected image on a screen, but not to focus the image. In many instances, such vario and variator devices have been used, in combination with a front optical system or a rear optical system. In some instances they have even been used in combination with both a front optical system and a rear optical system. However, in all known instances such optical systems which incorporate vario and variator optical systems have been used to alter the size of an image but not to focus the image, and are used and usually only function at relatively short back focal distances.

Afocal variators of the specific type described in the present application have been known and in commercial use and on sale, by themselves, for at least fifteen years, for example for use in projector lenses to alter the size of a projected image on a screen. However, while afocal variator optical systems of the specific type disclosed herein, have been previously known in the art, such afocal variator optical systems are not known to have been previously used in the art to focus optical systems in the manner disclosed, provided and claimed by the present application, as opposed to the prior art use to alter image size at a fixed focal plane.

It is thus seen that while the use of varios and variators, either alone, or in combination with either a front optical system or a rear optical system are known, they are not known to have been used in combination with both a front optical system and a rear optical system to alter active focal length so as to act as a focusing system as opposed to a system for altering image size at a fixed focal plane, such as a zoom lens.

In the past where it has been desired to alter focal length, this has usually been accomplished by continuously or discretely changing the length of the optical system, or by changing the location or type of imaging lenses in the front or rear, or in both front and rear optical systems. Altering focal length without utilizing the imaging lens system, or changing the length of the optical system, or changing the location or type of lenses in either the front or rear optical system has not been known in the prior art.

In the known prior art, Hillman U.S. Pat. No. 2,937,570 discloses a telescope system in which the image forming lenses are moved in order to focus the system. That is, focusing is accomplished by moving objective lens and focusing lens, which are part of the telescope's "formula-specific" objective imaging system. Focusing is not accomplished or taught to be feasible by moving a portion of an afocal variator, nor by moving a portion of any other non-image forming modular optical lens system. Furthermore, this reference discloses a "formula-specific" optical system in which the lenses are all calculated and assembled to work together to form a telescope. It does not include an independent optical lens system module which is non-image forming. It does not include a central afocal variator module which does not comprise a portion of the image-forming optics. If any of the movable lenses of any of the systems taught by Hillman were removed, the entire system would be affected, very probably to the point that the system would no longer function for its intended purpose.

Quenderff French Patent No. 2,572,545 the use of a zoom lens to make enlarged pictures, and also teaches the use of various art known mechanical devices for connecting together optical modules. However, it neither teaches nor suggests the use of a central afocal variator module as a focusing element.

SUMMARY OF THE INVENTION

In view of the foregoing, it is an object of the present invention to provide an optical system in which an afocal variator optical system alters the active focal length of a front optical system in combination with a rear optical system.

It is another object of the present invention to provide a central element which carries an afocal variator optical system, to which central element both a front optical system and a rear optical system can be substantially permanently connected in combination.

Another object of the present invention is to provide such a central element which carries an afocal variator optical system which consists of a front positive lens and a rear positive lens which are positioned in substantially fixed spaced relation to one another, and a negative lens which is positioned between such fixed front positive and rear positive lenses, and which negative lens is designed and supported in the central element in such a manner that it is capable of being moved toward and away from the front positive lens or toward and away from the rear positive lens.

Another object of the present invention is to provide such a central element which is simple in construction and design and which lends itself to the substantially permanent attachment of both a front optical system and a rear optical system.

It is yet another object of the present invention to provide an element which carries an afocal variator optical system, which element has the capability of allowing the substantially permanent connection to it, in combination, of a front optical system and a rear optical system.

It is also an object of the present invention to provide such an optical system with the ability to focus from infinity to about 3 cm (1.2 inches).

It is another object of the present invention to provide such an optical system having a high depth of field.

It is yet another object of the present invention to provide a optical system which provides both the ability to focus from infinity to about 3 cm (1.2 inches) and the ability to provide a high depth of field.

It is yet another object of the present invention to provide such systems which are simple and inexpensive to provide.

The foregoing objects of the present invention are obtained by providing a modular optical system which has the ability to vary the actual focal length of a front optical system in combination with a rear optical system, without the need to physically change the length dimension, or the need to change the lens position of the front or rear optical system, or the need to change the lenses of the front or rear optical system. In preferred embodiments this is accomplished by the provision of a central element which carries an afocal variator optical system which includes in optical series a first positive lens, a negative lens, and a second positive lens; a front lens system located in optical series in front of the first positive lens of the afocal variator and in substantially permanent attachment to the central element, and a rear optical system located in optical series to the rear of the second positive lens of the afocal variator and in substantially permanent attachment to the central element. Within the afocal variator, the negative lens is so positioned and so controlled that it is capable of being moved continuously either towards and away from the first positive lens and towards and away from the second positive lens, all while the distance between the first positive lens and the second positive lens of the afocal variator optical system and the length of the central element remains substantially constant. In substantially all instances of the present invention, the afocal variator optical system is located and supported by a central element system which includes front end connecting means for substantially permanently connecting with the front optical system and rear end connecting means for substantially permanently connecting with the rear optical system. In a similar manner, means are provided in conjunction with the front optical system and in conjunction with the rear optical system to allow their substantially permanent connection to the central element.

In one preferred embodiment of the present invention an optical system is provided which may be used as either a long range microscope or as a telescope and which has the ability to provide a high depth of field and to focus from infinity to about 3.2 cm. This is accomplished by providing the optical system of the present invention with a front optical system having a negative lens and a rear optical system having a positive lens.

In another preferred embodiment an optical system is provided which may be used as a telescope. This is accomplished by providing the optical system of the present invention with a front optical system having a positive lens and a rear optical system having a negative lens.

It is therefore seen that the present invention provides an optical system in which the afocal variator optical system of the present invention alters the focal length, and therefore the power of the front optical systems by altering its focal length, either individually, or in combination with a rear optical system. This modifies the optical system as if either an infinite number of lenses had been put in the place of the afocal variator optical system, or as though a substantial variable length of separation is provided between the front optical system and the rear optical system. Therefore, for example, where the front optical system is a positive lens system, and the rear optical system is a negative lens system, the change in the focal length of the positive lens system by the afocal variator optical system provides substantially an infinite number of forward conjugate foci with respect to the rear negative lens system, thereby providing a focusable telescope system.

The system of the present invention uses an independent non-image forming modular optical afocal variator lens system which does not comprise a portion of the image-forming optics in the modular optical systems in which it is included. The system of the present invention is not formula-specific. If the afocal variator of the present invention, which includes a movable lens for purposes of focusing the entire system, were removed in its entirety, the remaining system modules would be substantially unaffected, and the remaining system components would still function for their intended purpose.

The afocal variator module of the present invention can be put into substantially any optical system into which it can be physically fit with substantial disregard for formula specificity. If the afocal variator module were to be removed from the modular optical systems of the present invention, it would not substantially change the characteristics of the optical system in which it had formerly been placed. For example, where the afocal variator module is positioned in a telescope between a front negative lens system and a rear positive lens system it can be used to focus the telescope. However, if the afocal variator lens system of the present invention were to be removed from the telescope the remaining system would still function as a telescope.

It is therefore seen that the present invention provides a modular system in which an afocal variator optical system module, including means for substantially permanently connecting a front optical system module, and means for substantially permanently connecting a rear optical system module.

These and other objects of the present invention will become apparent to those skilled in the art from the following detailed description, showing the contemplated novel construction, combination, and elements as herein described, and more particularly defined by the appended claims, it being understood that changes in the precise embodiments of the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENT

Figure 1:
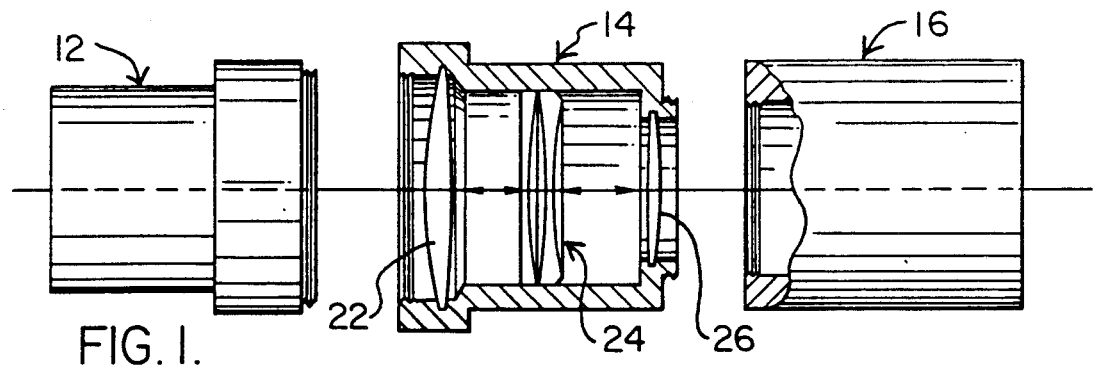
FIG. 1 is an exploded diagrammatic view, partially broken away, which illustrates the present invention in which a fixed length afocal variator optical system module is positioned between a front optical system module and a rear optical system module, for substantially permanent connection therewith.

Referring to FIG. 1 there is shown in exploded view an optical system, generally 10 consisting of three major modular components which are designed for substantial permanent connection to one another, a front modular optical system 12, an afocal variator modular optical system 14, shown broken away, and a rear modular optical system 16 shown partially broken away. As illustrated, the afocal variator optical system 14 consists of a fixed length tube 20 in which there is located a front positive lens 22, a central negative lens 24, in this case a negative doublet, and a rear positive lens 26. Front positive lens 22 and rear positive lens 26 are secured to tube 20 in a manner such that the distance between them is substantially fixed. However, negative lens 24 is located within tube 20 and constructed in such a manner that it can be moved continuously within tube 20 up and back between front lens 22 and rear lens 26. That is, negative lens 24 is capable of being moved towards and away from front lens 22 and is also capable of being moving towards and away from rear lens 26. All of this is made possible by the system for holding the lenses of the afocal variator optical system 14. This holding system may consist of tube 20, as shown, or of any other lens holding system, such as a lens positioning platform system of the type that is well known in the art, or the like As shown, tube system 20 includes front connecting means, in this case a series of female threads 28 and rear connecting means, in this case a series of male threads 30, to which front optical system 12 and rear optical system 16 can be appropriately connected by means of their own respective male and female thread connectors 32 and 34.

Negative lens 24 may be moved within tube 20 by a linear slider, a helical slider, or by any other art known means for providing continuous linear motion to a lens.

Both front optical system module 12 and rear optical module system 16 may carry substantially any known lens system. They may include an optical flat, a single positive lens, a doublet positive lens having its convex surface forward, a doublet positive lens having its convex surface rearward, a double convex doublet positive, a double concave doublet positive, a single negative lens, a doublet negative lens having its convex surface forward, a double negative lens having its convex surface rearward, a double convex doublet negative lens, a double concave doublet negative lens, two or more spaced apart lens elements which provide a positive optical effect, and two or more spaced apart lens elements which provide a negative optical effect.

The combination of an afocal variator optical system module 14 with a front optical system module 12, as taught by the present inventor, has the unique feature of altering or varying the actual focal length of front optical system 12, whether in the form of a real image, as provided by a positive lens, or in the form of a virtual image as provided by a negative lens. The resulting variation of the focal length effects the convergence or divergence of the light which enters rear optical system 16, and therefore of the light (or image) which exits from rear optical system 16. This allows the focus of the system to be changed without changing the length of the overall system or of any modular element in the system, and without changing the lenses in the front or rear modular system.

In one preferred embodiment, front positive lens 22 and rear positive lens 26 of the afocal variator optical system 14 are, for example, each about $+160$ mm lenses, while the negative lens 24 is about a $-80$ mm doublet. The movement of negative lens 24 up and back between front positive lens 22 and rear positive lens 26 alternatively increases or decreases the effective focal length of the optical system. In the example illustrated and just described, the effective focal length can be made to vary from a factor of about 0.8, when negative lens 24 is at its closest point adjacent to front lens 22, to a factor of about 1.3 when negative lens 24 is at its closest point adjacent to rear lens 26. When negative lens 24 is halfway between front positive lens 22 and rear positive lens 26 of equivalent power, the afocal variator system has a relative factor of 1.0. It is therefore seen that, in the system which has just been detailed, the movement of negative lens 24 within afocal variator optical system 14 operates to provide an analog to an increased or decreased virtual image without varying the length of the afocal variator system, without the need to physically change the length dimension of either the front or the rear module system, or without the need to change the lens position, or without the need to change the lenses of the front or rear optical module systems.

Positioning afocal variator optical system 14 between front and rear optical systems 12 and 16, serves to optically separate front optical system 12 and rear optical system 16. When negative lens 24 within the afocal variator optical system is moved, this provides an optical analog of a change in the distance between front optical system 12 and rear optical system 16. However, this is accomplished without the actual physical change in the distance between front optical system 12 and rear optical system 16 toward and away from one another. The result is that the focus of the combined front optical system 12, afocal variator optical system 14, and rear optical system 16 is effectively alterable without changing the length dimension or distance between any module.

Figure 2:
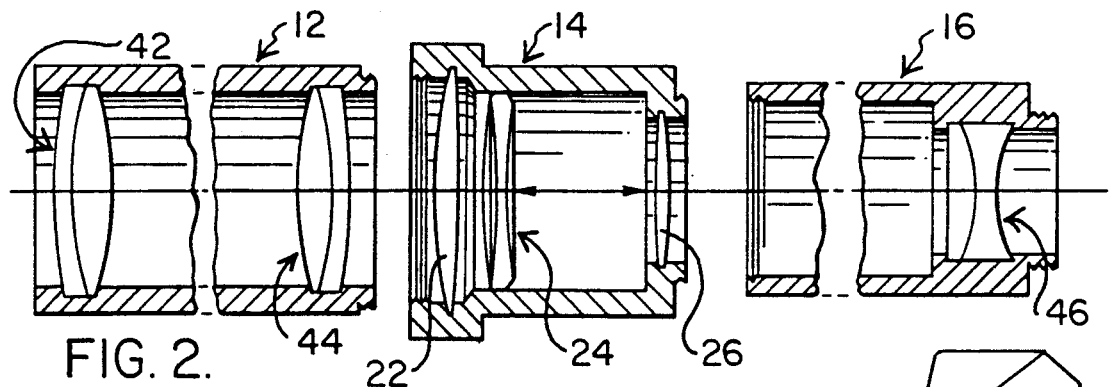
FIG. 2 is a species of FIG. 1, shown in exploded view, in which the front optical system module carries a pair of spaced apart positive achromats and the rear optical system module carries a negative achromat.

Now referring to FIG. 2, a specific preferred embodiment of the present invention is provided. In this species, afocal variator optical system 14 is substantially the same as that shown in FIG. 1, although negative lens 24 is shown located substantially adjacent front positive lens 22. In the system of FIG. 2. front optical system 12 is shown as including two spaced apart doublet achromats 42 and 44. Also in this embodiment, rear optical system 16 is shown as including a negative achromat 46, in the form of a doublet which consists of a plano/concave lens having its concave surface rearwardly facing.

The system of FIG. 2 functions as a telescope, enlarging distant objects as viewed through rear optical system 16. The afocal variator optical system 14 alters the effective focal length of the light passing through lenses 42 and 44 with respect to rear lens 46. This is due to the fact that in this embodiment the afocal variator optical system provides a rear focal plane at a predetermined position. As the rear conjugate focal plane is held constant the front conjugate focus will vary accordingly, thereby allowing the afocal variator optical system to act essentially as a fixed length internal focusing device. Therefore, for example, in the embodiment of FIG. 2, where the rear lens 46 is a negative achromat of about $-109$ mm, the telescope has ability to focus from about 2.4 meters (8 feet) to about 50.8 cm (20 inches).

Figure 3:
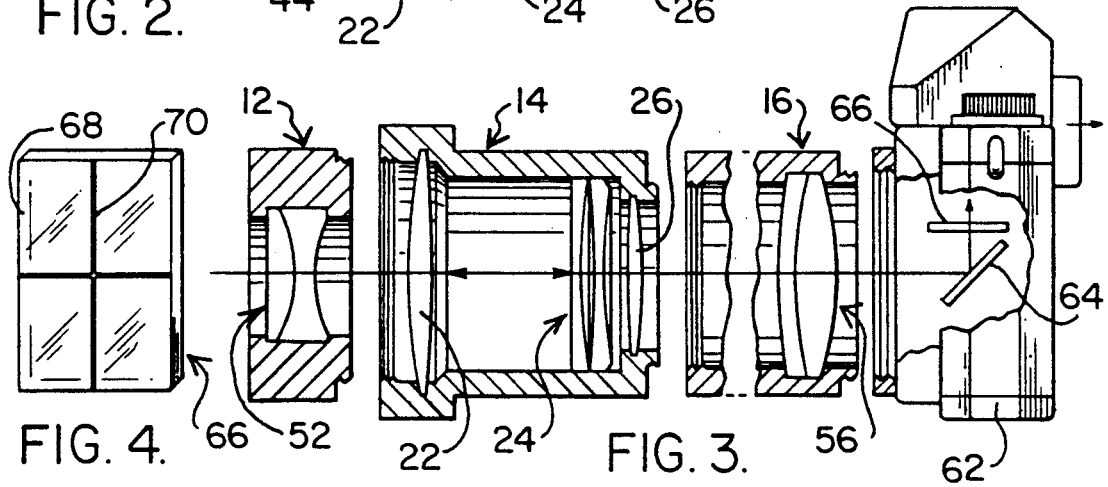
FIG. 3 is yet another species of FIG. 1, shown in exploded view, in which the front optical system module carries a negative lens and the rear optical system module carries a positive achromat which is shown in association with a reflex camera body which includes a reflecting element and a clear screen with a reference reticle.

Now referring to FIG. 3, there is shown yet another variation of the present invention in which the system can serve as either a close focusing telescope or as a long working distance microscope. In this species, afocal variator optical system module 14 is substantially the same as that shown in FIG. 1, although negative lens 24 is shown located substantially adjacent rear positive lens 26. In this system, afocal variator optical system module 14 is substantially permanently connected to a front optical system 12 which includes a negative achromat doublet 52, while rear optical system 16 includes a positive achromat 56, also in the form of a doublet. Using a rear conjugate of about 180 mm, the system of FIG. 3 has been found to allow focusing from infinity to approximately 3.2 cm (1.2 inches), while providing, even at the closest focus, a substantial depth of field.

While not shown in FIG. 3, the addition of art known diaphragms between the afocal variator optical system 14 and positive achromat lens 56 in rear optical system 16 will enhance the ability of the system to obtain an excellent depth of field. In one specific embodiment of the system of FIG. 3, an afocal variator having the lens types described above is utilized, while the front optical system 12 includes a front negative lens of about −109 mm and lens 56 in rear optical system 16 is a positive 75 mm lens. Again, in this modification, the afocal variator optical system acts as though it is changing the distance between the front lens systems and the rear lens systems without any actual change in the length dimension of the system. Utilizing lenses of this type and magnitude it is found that the system of FIG. 3 has the ability to focus from about infinity to about 1.25 inches (3.1 cm), and also to provide a substantial depth of field.

Figure 4:
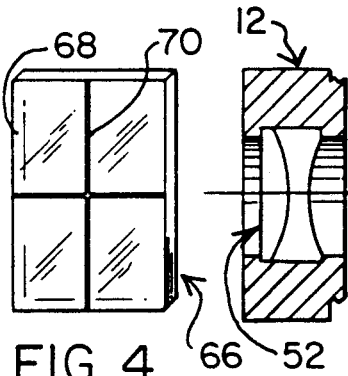
FIG. 4 is an enlarged top perspective view of the clear screen of FIG. 3 showing one form of reference reticle.

As further illustrated in FIG. 3, this form of the lens system of the present invention is shown in association with a to-be-focused apparatus, in this case reflex camera 62. For use in focusing, camera body 62 includes diverting reflector 64 and reticle 66 in the optical path. In this instance reticle 66 consists of a transparent screen 68 carrying cross-hairs 70 on its top surface, in this case of the type shown in additional detail in FIG. 4.

The foregoing is applicable to any form of reflex camera or other through the lens focusing apparatus. Diverting reflector 64 may be a mirror or any equivalent reflecting device. While reference reticle 68 is shown in the form of a cross-hair, other forms of reticle may be used.

This application of the present invention in conjunction with a reticle equipped apparatus, such as reflex camera 62, permits positive, accurate and definite focusing to be determined aerially by eye by the user in visible light, or by sensors known in the art for visible and non-visible light wavelengths in conjunction with embodiments of the invention which can be equated to any known focal length commonly used in photography or electronic imaging. This is possible using optical devices of the present invention, which include an intermediate afocal variator, because the focal lengths of such devices change significantly enough for focus to be observed quickly and positively as an aerial image in the viewfinder of the camera. By comparison, in the prior art, using conventionally-focusing optical systems, such a reflex camera utilizes a translucent screen, such as a ground glass, to act as a plane of common reference with the non-reflex image or film plane. Because of the ability of the optical system of the present invention to focus quickly by substantial focal length variator, no such translucent screen is required to act as a plane of common reference. Aerial image focusing of equipment using a modular afocal variator optical focusing system equipped optical systems described herein, provides a brighter (non-diffused) image to the user, thereby resulting in the ability of a user to quickly and positively determine focus, even under adverse low-light conditions.

Conventionally focusing lenses of standard or wide-angle focal length (e.g., for the 35 mm format, of 28 mm or 50 mm focal length) are substantially impossible to focus aerially with a positive assurance of accuracy. Some photographic optics, particularly of long focal length type, such as telephoto lens systems, can be approximately focused aerially, at distances other than near infinity or infinity itself; however, the small tolerance of focus observed through such conventionally-focusing optics are not accurate or reliable. Therefore, it has been the practice in the art, to use additional aids such as microprisms, anamorphic cylinders or split-image wedges for reliable focusing.

To summarize, the modular afocal variator module of the present invention can be positioned in any operational optical instrument between a front optical system and a rear optical system, provided that there is enough physical space to do so, and it can and will then serve to focus that instrument to some degree or another.

Unlike so many other optical systems, the optical systems of the present invention which are combined with the afocal variator do not appear to be limited, other than by compatibility, by the material from which the lenses are composed, the refractive indices of the lenses, dispersive characteristics, or the radii of the lenses. While threaded connections between the modular optical systems have been shown, any other art known connecting system, such as bayonet connectors, slip rings, set pins, dovetail, flange and the like may be used to provide the substantially permanent connections between the modules.

While the present invention has been shown and described with respect to specific variations, its principles have many other uses. These uses include the use of the system of the present invention as a replacement bellows for photographic cameras, a focuser for microscope cameras, for optical range finding, as a focuser for standard, compound and stereo microscopes to provide effective changes of tube length, without actual changes in the length dimension; as an adapter for parfocalization to allow a portion of one type of microscope and its tube accessories to be coupled with another portion of another microscope as a focuser for telephoto lenses, as a focuser for light in a microscope or other illumination system, and as a focuser of microscopes and other condensing systems.

It is therefore seen that the present invention provides a an optical system in which a specific form of afocal variator optical system alters the active focal length of a front optical system in combination with a rear optical system. It also provides a central element which carries an afocal variator optical system, to which central element both a front optical system and a rear optical system can be substantially permanently connected in combination. It further provides such a central element which carries an afocal variator optical system which consists of a front positive lens and a rear positive lens which are positioned in substantially fixed spaced relation to one another, and a negative lens which is positioned between such fixed front positive and rear positive lenses, and which negative lens is designed and supported in such a manner that it is capable of being moved toward and away from the front positive lens or toward and away from the rear positive lens. Furthermore it provides such a central element which is simple in construction and design and which lends itself to and has the capability of allowing the substantially permanent attachment, in combination, of both a front optical system and a rear optical system. Furthermore it has the capability of providing an optical system which provides both the ability to focus from infinity to about 3 cm and the ability to provide a high depth of field. Such systems may be simple and inexpensive to provide.

While the invention has been particularly shown, described and illustrated in detail with reference to preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

What is claimed is:

1. A modular optical system including in combination a front element module which carries a lens system and a rear element module which carries a lens system, said front element module and said rear element module together define an operational optical instrument, and a central element module which carries a lens system, said central element module being intermediate said front element module and said rear element module, said modular optical system has the ability to have the actual focal length of said lens system carried by said front element module varied in conjunction with said lens system carried by said rear lens system module wherein the improvement comprises:
said optical system carried by said central element module carries an afocal variator, and wherein connecting means are carried by said central element module, said front element module and said rear element module, whereby said element modules can be connected in optical series.

2. The modular optical system of claim 1, wherein said afocal variator carried by said central element module includes in optical series a first positive lens, a negative lens, and a second positive lens, and wherein further said negative lens within said afocal variator is so positioned and so controlled that it is capable of being moved continuously towards and away from said second positive lens, all lens, and towards and away from said second positive lens. All while the distance between said first positive lens and said second positive lens of said afocal variator remains substantially constant.

3. The modular optical system of claim 2, wherein said negative lens in said afocal variator is a negative doublet lens.

4. The modular optical system of claim 1, wherein said central element module includes front end connecting means and rear end connecting means for connecting said central element module with said front element module and with said rear element module, respectively.

5. The optical system of claim 1, wherein said front lens system which is carried by said front element module and said rear lens system which is carried by said rear element module are each selected from the group consisting of an optical flat, a single positive lens, a doublet positive lens having its convex surface forward, a doublet positive lens having its convex surface rearward, a double convex doublet positive, a double concave doublet positive, a single negative lens, a doublet negative lens having its convex surface forward, a doublet negative lens having its convex surface rearward, a convex doublet negative lens, a double concave doublet negative lens, a lens system which is comprised of two or more spaced apart lenses which together provide a positive optical effect, and a lens system which is comprised of two or more spaced apart lenses which together provide a negative optical effect.

6. The optical system of claim 1, wherein other focusable optical equipment is present, and said rear element module includes rear end connecting means, and is connected to said other optical equipment by said rear end connecting means; whereby, said optical system of claim 12 is capable of quick aerial focusing of such other focusable optical equipment.

7. The optical system of claim 6, wherein said other focusable optical equipment is a reflex camera body.

8. The optical system of claim 7, wherein said reflex camera body includes a reflecting element and a reticle in optical series with said rear element module.

9. An integrated optical system including in optical series an afocal variator as a central element, a front optical system element containing at least one lens and a rear optical system element containing at least one lens, said front optical system and said rear optical system together define a substantially operational optical system, said integrated optical system having the ability to have its actual focal length vary, wherein:
said afocal variator central element includes in optical series a first positive lens, a negative lens and a second positive lens, said negative lens being so positioned and so controlled that it is capable of being moved towards and away from said first positive lens and towards and away from said second positive lens, and wherein the distance between said first positive lens and said second positive lens of said afocal variator element remains substantially constant.

10. The modular optical system of claim 9, wherein said negative lens in said afocal variator central element is a negative doublet lens.

11. The optical system of claim 9 wherein said afocal variator central element includes a front end and a rear end, and means for connecting are included in combination with said afocal variator central element front end and rear end for connecting said afocal variator central element with said front optical system element and with said rear optical system element.

12. The optical system of claim 11 wherein said means for connecting said front of said central afocal variator element to said front optical system element and with said rear optical system element is selected from the group consisting of a cylindrical female thread, a cylindrical male thread, bayonet connectors, slip rings, set pins, dovetail connectors, and flange connectors.

13. The modular optical system of claim 9, wherein said central element includes front end connecting means and rear end connecting means for substantially permanently connecting said central element with said front optical system element and said rear optical system element, respectively.

14. The optical system of claim 9 wherein said front optical system element and said rear optical system element are each selected from the group consisting of an optical flat, a single positive lens, a doublet positive lens having its convex surface forward, a doublet positive lens having its convex surface rearward, a double convex doublet positive, a double concave doublet positive, a single negative lens, a doublet negative lens having its convex surface forward, a doublet negative lens having its convex surface rearward, a convex doublet negative lens, a double concave doublet negative lens, a lens system which is comprised of two or more spaced apart lenses which together provide a positive optical effect, and a lens system which is comprised of two or more spaced apart lenses together provide a negative optical effect.

15. The optical system of claim 9, wherein other focusable optical equipment is present, and said rear element module includes rear end connecting means, and is connected to said other optical equipment; whereby, said optical system of claim 9 is capable of quick aerial focusing of such other equipment.

16. The optical system of claim 15, wherein said other focusable optical equipment is a reflex camera body.

17. The optical system of claim 16, wherein said reflex camera body includes a reflecting element and a reticle in optical series with said optical system.

18. An integrated optical system including in optical series an afocal variator as a central element, a front optical system element containing at least one lens, and a rear optical system element containing at least one lens, wherein:

said afocal variator central element includes in optical series a first positive lens, a negative lens and a second positive lens, said negative lens being so positioned and so controlled that it is capable of being moved towards and away from said first positive lens and towards and away from said second positive lens, and wherein the distance between said first positive lens and said second positive lens of said afocal variator remains substantially constant; and wherein further, other focusable optical equipment is present, and said rear element module is connected to said other focusable optical equipment and is capable of quick aerial focusing of such other equipment.

* * * * *